A. C. BRANTINGHAM.
AUTOMATIC FEED GATE FOR ROLLER MILLS.
APPLICATION FILED MAR. 11, 1912.
1,054,334.
Patented Feb. 25, 1913.
2 SHEETS—SHEET 1.
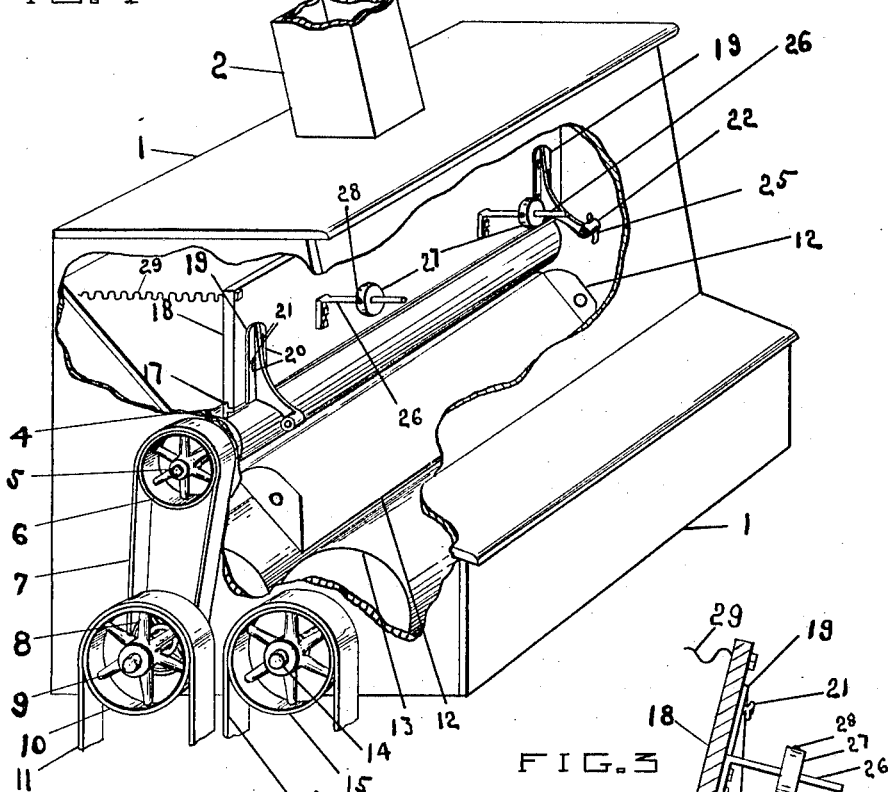
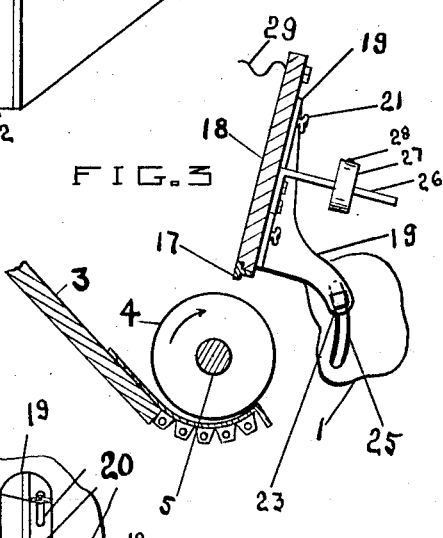
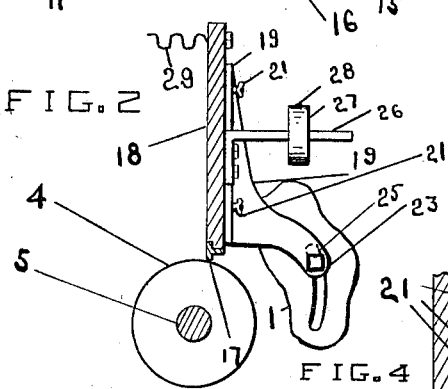
WITNESSES:
Gladys Jameson.
INVENTOR
Allen C. Brantingham
BY
Geo E Kirk
ATTORNEY A. C. BRANTINGHAM.
AUTOMATIC FEED GATE FOR ROLLER MILLS.
APPLICATION FILED MAR. 11, 1912.
1,054,334.
Patented Feb. 25, 1913.
2 SHEETS—SHEET 2.
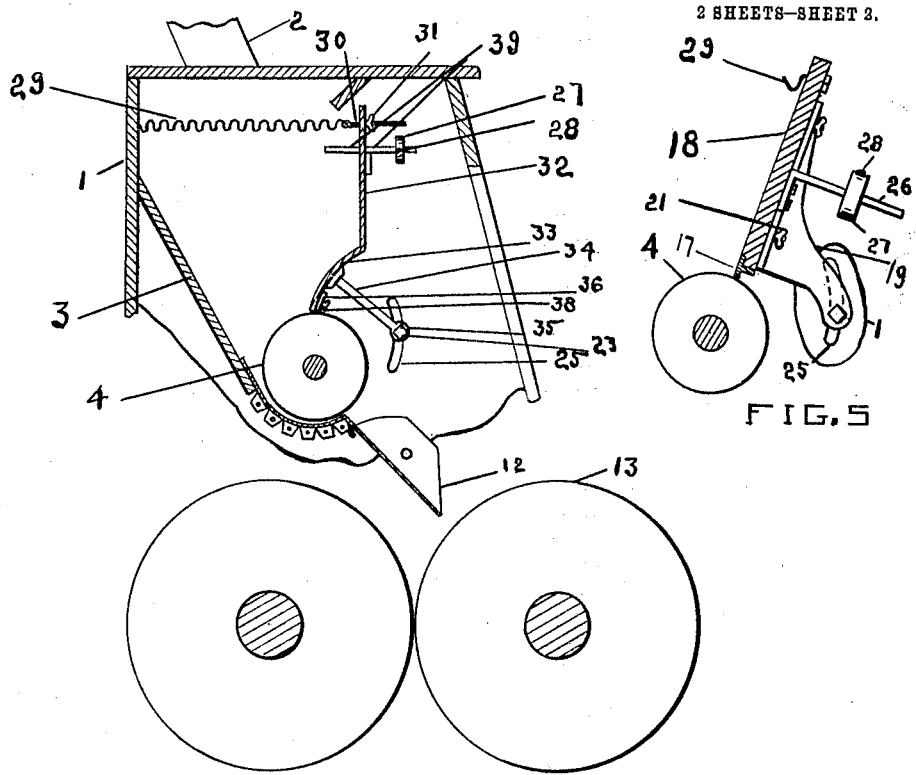
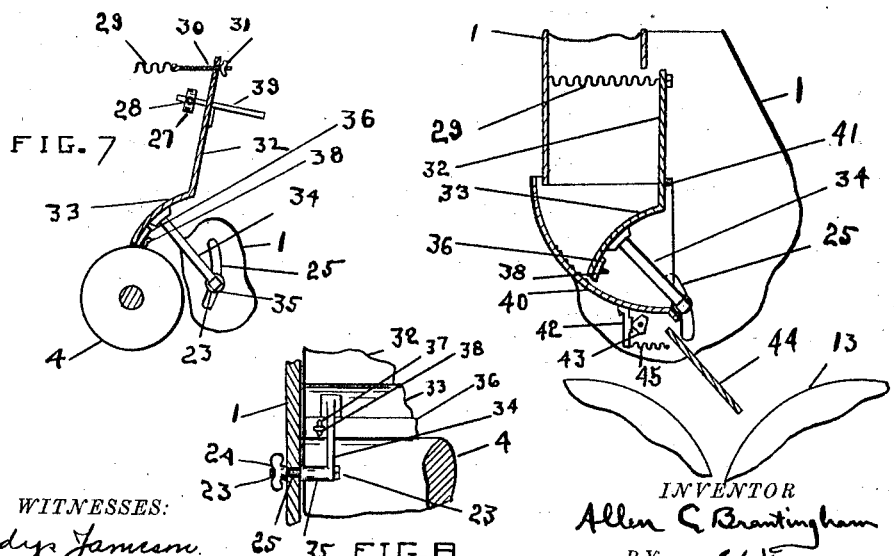
WITNESSES:
Gladys Jamison
C. F. Rauch
INVENTOR
Allen C. Brantingham
BY Geo E Kirk
ATTORNEY

UNITED STATES PATENT OFFICE.

ALLEN C. BRANTINGHAM, OF TOLEDO, OHIO.

AUTOMATIC FEED-GATE FOR ROLLER-MILLS.

1,054,334. Specification of Letters Patent. Patented Feb. 25, 1913.

Application filed March 11, 1912. Serial No. 683,032.

*To all whom it may concern:*

Be it known that I, ALLEN C. BRANTINGHAM, a citizen of the United States, residing at Toledo, Lucas county, Ohio, have invented new and useful Automatic Feed-Gates for Roller-Mills, of which the following is a specification.

This invention relates to feed regulators.

This invention has utility when embodied in a hopper gate, especially in connection with a feed roll hopper in roller mills.

Referring to the drawings: Figure 1 is a perspective view, with parts broken away, showing an embodiment of the invention in a roller mill; Fig. 2 is a detail view showing the end of the feed roll in elevation, and a medial section of the feed regulator gate as riding close to the feed roll; Fig. 3 is a view similar to Fig. 2, but showing the hopper, and with the gate as tilted back by the stock when at the adjustment shown in Fig. 2; Fig. 4 is a fragmentary detail showing the mounting of the gate on its bracket and the bracket mounting in the roller mill housing; Fig. 5 is a view similar to Fig. 2, but with the gate in a different adjusted position to provide an increased feeding arc for the feed roll and also to provide an increased incline to the straight portion of the gate for different action of the stock thereagainst; Fig. 6 is a fragmentary medial vertical section through a roll housing, showing the rolls in end elevation; showing a different embodiment of the gate from that illustrated in Fig. 2; Fig. 7 is a fragmentary view of the feed roll in end elevation and the gate of Fig. 6 adjusted for inclination instead of having its straight portion vertical as in Fig. 6; Fig. 8 is a fragmentary view of the mounting of the gate of Fig. 6; and Fig. 9 is a view of the gate of Fig. 6 in combination with a vibrator feed instead of a feed roll.

The roller mill housing 1 has the material, say certain breaks in the grinding of wheat, supplied thereto by the chute or spouting 2. This material in its flow from the spouting or way section 2 falls upon the central portion of the hopper section 3 of the way. The feed roll 4 in the bottom of this hopper 3, in regular operation rotates upward into the hopper 3 to carry the material over the top of the roll 4 from the hopper. The roll 4 is provided with the trunnion or shaft 5 carrying the roll in the housing 1, as well as providing a mounting for the pulley 6, which through belt 7 from the pulley 8 serves to drive the feed roll 4 from the shaft of the grinding roller, herein shown as the slower roll. This slow speed roll shaft 9 carries the pulley 10 driven by the belt 11.

The spill or feed of material over the top of the feed roll 4 is directed by the adjustable chute 12 upon the fast grinding roll, herein shown as the roll 13 having the mounting shaft 14 carrying the pulley 15 driven by the belt 16.

To spread the material discharged into the hopper 3 for uniform feeding the full length of the grinding rolls, there is provided the gate having at its lower edge a loading or weighted section 17 mounted on the gate proper 18, which gate 18 is carried by a pair of brackets 19 having slots 20 therein so that the gate may be vertically adjusted as to its brackets and firmly held by the wing nuts 21 thereon. This adjustment of the gate as to its bracket serves to change the inclination of the gate as to the feed roll and is a convenient control device in adapting the gate to varying stocks as to their angles of repose and also as to their specific gravities acting to tilt the gate. The brackets 19 have fulcrum sleeves 22 for the pivotal mounting bolts 23, adjusted by the wing nuts 24 to various positions in the arcuate slots 25 of the roller mill housing 1. With this arcuate slot 25 of curvature of feed roll center as its center or on the radius of the feed roll from a center without the feed roll, adjustments in said slot merely vary the exposure or feeding arc of the feed roll 4, while with a different arc slot 25, the adjustment to offer additional feeding arc for the feed roll may simultaneously tilt the gate to such angle as may better adapt the gate for controlling such stock. For instance this tilting as shown in Fig. 5 gives an increased incline to the gate to increase the loading action thereon of light stock. Should it be desired to maintain the gate vertical, or at a fixed inclination, the adjustment between the bracket and the gate may be used *i. e.* by adjusting the gate on its bracket radially outward from the roll the gate may swing against the roll for more nearly vertical normal position. Opposite adjustment of the gate gives inclination desirable in the handling of lighter stock.

The gate 18 in effecting the uniform spreading of the material along the roll 4, as the material is fed thereover to fall on the chute 12, rides at the adjusted normally close position to the feed roll 4, for the rotation of the feed roll 4 from the hopper 3 toward the gate tends to force the material in the lower part of the hopper 3 to hold the gate in its lowest position, or nearest to the roll 4. The position of the pivotal mounting or fulcrum 23 permits this action to be more effective in holding the gate closed when adjusted as shown in Figs. 2 and 3, than in Fig. 5. The loading 17, say of metal as iron or steel, lends a steadiness to the gate 18 in this material control action, besides affording a rigid straight edge adjacent the feed roll or travel portion of the way. The adjustment means 20, 21, permits variation in clearance of the gate as to the feed roll, as desired with different kinds of material handled, as also further permits a lining up of the gate with the roll.

In general mill operation, the roller mills are each in a way conducting stream of material which should be handled, even though it vary in volume. With an increase in the supply to the hopper 3 of the way, there is accumulation which in piling up therein gradually has its mean thrust farther and farther from the loading 17. As the fulcrum or pivotal mounting of the gate 18 is considerably below the top thereof, this rise of the mean thrust neutralizes and then overcomes the normal gate closing tendency of the material adjacent the roll 4, resulting in the swinging of the gate 18 upon its pivotal mounting, with a minimum of gate movement adjacent the roll 4 and a maximum of gate movement remote therefrom. This rocking of the gate 18 increases the amount of clearance between the roll 4 and the lower or loaded portion 17 of the gate, thus allowing of increased feed rate of material. As the accumulation of material in the hopper is thus reduced, the mean thrust against the gate 18 is lowered to the neutralizing point, and as the action against the lower portions of the gate again predominates, the gate is automatically reset by the material into its minimum clearance or flow regulating position.

The sensitiveness of the gate action may be increased, as well as the position of the neutral point, upon the exceeding of which accumulation the gate begins to open, varied in a wide range. One way of changing the neutral point to almost eliminate the closing force of traveling material is shown in Fig. 5, but herein the counter action of the material loading down the inclined face of the gate 18 lends stability to the operation. To further regulate the sensitiveness of the gate and vary its action, the brackets 26 are provided, along which the weights 27 may be adjusted by the set screws 28, while the counterweights 27 may have their action, especially at maximum opening position of the gate 18, modified by the springs 29. As stock varies in fineness or other qualities affecting the handling thereof, as in changing the feeding arc of the feed roll 4, the range of these adjustments makes possible ready adaptation of the gate to the most widely varying conditions.

In the device of Fig. 6, the spring 29 is shown as connected to the rod 30 having a rockable adjustable connection by the wing nut 31 with the straight portion 32 of the gate which has its lower portion 34 curved or arcuate, which lower portion has the mounting bracket 34 extending to the pivot 35 at the center of curvature of the arc gate portion 33, to adjustably mount the gate by the bolt 23 in the curved slot 25, which adjustment is effected by the wing nut 24 (Fig. 8). Adjacent the feed roll 4, the gate portion 33 is provided with the loading 36 having slots 37 therein to permit adjustment by the wing nuts 38 to aline the gate with the roll or way, as well as vary the inclination of the straight gate portion 32 independently of the arc adjustment 23, 24, 25. For greater range of counterweighting, the weight 27 is mounted on the bracket 39 permitting adjustment toward and from the gate portion 32 on either side thereof, as shown in Figs. 6 and 7. Besides retaining all the advantages of the gate of Fig. 1, this gate of Fig. 6 has a minimum of closing resistance through the traveling material as the load or accumulation in the hopper goes down, and is further quite stable in its spreading action and holding adjustment until the accumulation exceeds the curved portion 33 of the gate and acts upon the straight portion 32 to lend effective thrust for gate opening.

This gate, as shown in Fig. 9, is used in a vibrator feed for rolls, the shaking hopper 40, being pivoted at the point 41, and having its lug 42 contacted by the rotating shaking cam 43 to effect spill of material past the gate 33 upon the incline 44 toward the grinding rolls, which hopper 40 is held against the cam 43 by the spring 45. The gate here swings downwardly to open resulting in a structure of increasing sensitiveness as the accumulation increases, but adjustably stable under minimum or normal feeding conditions.

The pivotal mounting or support for the gate acts as a fulcrum with the shorter arm adjacent the adjustable opening or feed roll portion of the hopper, while the longer arm is more remote therefrom. In the disclosures wherein the bracket 34 is not adjustable as to the gate proper, say as shown in Figs. 7, 8 and 9, the bracket 34 is in effect integral with the gate proper.

What is claimed and it is desired to secure by Letters Patent is:

1. A hopper provided with a discharge opening, a gate in said hopper, said gate provided with an arc portion and a portion rigid with the arc portion, said gate portions being disposed in said hopper and movable to vary the hopper volume, said gate having supporting means permitting yielding of the gate throughout the extent of the gate to increase the hopper effective cross section in an increasing amount as the distance from the discharge opening increases.

2. A hopper having a discharge opening, and a movable gate within said hopper, said gate having an arc portion adjacent said discharge opening, a rigid extension at its end away from said discharge opening, and operating means for said gate adapted to move said arc portion a less distance than said extension portion.

3. A hopper provided with a discharge opening, a feed roll in said hopper adjacent the discharge opening, a gate for the hopper discharge opening, said gate providing an exposed arc for the feed roll and having a clearance as to said roll, and means for adjusting the gate to vary the exposed feeding arc of the feed roll and maintain the clearance of the gate as to said feed roll.

In testimony whereof I hereunto set my hand in the presence of two witnesses.

ALLEN C. BRANTINGHAM.

Witnesses:
  GEO. E. KIRK,
  C. O. RICHEY.

---

Copies of this patent may be obtained for five cents each, by addressing the "Commissioner of Patents, Washington, D. C."